(12) United States Patent
Gustavson et al.

(10) Patent No.: US 8,229,990 B2
(45) Date of Patent: *Jul. 24, 2012

(54) METHOD AND STRUCTURE FOR PRODUCING HIGH PERFORMANCE LINEAR ALGEBRA ROUTINES USING A HYBRID FULL-PACKED STORAGE FORMAT

(75) Inventors: Fred Gehrung Gustavson, Briarcliff Manor, NY (US); John A. Gunnels, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

This patent is subject to a terminal disclaimer.

(21) Appl. No.: 12/036,868

(22) Filed: Feb. 25, 2008

(65) Prior Publication Data

US 2008/0147701 A1  Jun. 19, 2008

Related U.S. Application Data

(63) Continuation of application No. 10/671,933, filed on Sep. 29, 2003, now Pat. No. 7,386,582.

(51) Int. Cl.
*G06F 7/32* (2006.01)
(52) U.S. Cl. ........................... 708/520; 708/200
(58) Field of Classification Search .................. None
See application file for complete search history.

(56) References Cited

U.S. PATENT DOCUMENTS

| | | | |
|---|---|---|---|
| 5,025,407 A | 6/1991 | Gulley et al. | |
| 5,099,447 A | 3/1992 | Myszewski | |
| 5,513,366 A | 4/1996 | Agarwal et al. | |
| 5,548,798 A | * | 8/1996 | King ........................ 710/68 |

(Continued)

OTHER PUBLICATIONS

Philip et al., PLAPACK: Parallel Linear Algebra Package Design Overview, 1997, IEEE Proceedings of the AMC/IEEE SC97 Conference.

(Continued)

*Primary Examiner* — Lewis A Bullock, Jr.
*Assistant Examiner* — Michael D Yaary
(74) *Attorney, Agent, or Firm* — McGinn IP Law Group, PLLC

(57) ABSTRACT

A signal-bearing medium tangibly embodying a program of machine-readable instructions executable by a digital processing apparatus to perform a method to at least one of reduce a memory space requirement and to increase a processing efficiency in a computerized method of linear algebra processing. A hybrid full-packed data structure is generated for processing data of a triangular matrix by one or more dense linear algebra (DLA) matrix subroutines designed to process matrix data in a full format, as modified to process matrix data using said hybrid full-packed data structure into a hybrid full-packed data structure, as follows. A portion of the triangular matrix data is determined that would comprise a square portion having a dimension approximately one half a dimension of the triangular matrix data. A first triangular portion of the triangular matrix data is fitted into a first location relative to data of the square portion, and a second triangular portion of the triangular matrix data is fitted into a second location relative to data of the square portion, such that the first triangular portion, the second triangular portion, and the square portion fit together to form the rectangular data structure. The hybrid full-packed data structure provides a substantially rectangular full format data structure for an entirety of the triangular matrix data and the triangular matrix comprises a triangular or symmetric/Hermitian matrix.

5 Claims, 4 Drawing Sheets

U.S. PATENT DOCUMENTS

| | | | |
|---|---|---|---|
| 5,644,517 | A | 7/1997 | Ho |
| 5,825,677 | A | 10/1998 | Agarwal et al. |
| 5,896,307 | A | 4/1999 | Volkonsky |
| 5,944,819 | A | 8/1999 | Kumar et al. |
| 5,983,230 | A | 11/1999 | Gilbert et al. |
| 6,021,420 | A | 2/2000 | Takamuki |
| 6,115,730 | A | 9/2000 | Dhablania et al. |
| 6,357,041 | B1 | 3/2002 | Pingali et al. |
| 6,470,368 | B1 | 10/2002 | Garg et al. |
| 6,507,892 | B1 | 1/2003 | Mulla et al. |
| 6,601,080 | B1 | 7/2003 | Garg |
| 6,675,106 | B1 | 1/2004 | Keenan et al. |
| 6,877,020 | B1 | 4/2005 | Bratt et al. |
| 7,028,168 | B2 | 4/2006 | Wadleigh |
| 7,031,994 | B2 | 4/2006 | Lao et al. |
| 7,836,112 | B2 * | 11/2010 | Bera ............................ 708/200 |
| 2003/0088600 | A1 | 5/2003 | Lao et al. |
| 2003/0187898 | A1 * | 10/2003 | Nakanishi ..................... 708/520 |
| 2004/0148324 | A1 | 7/2004 | Garg |

OTHER PUBLICATIONS

Agarwal et al., A High Performance Algorithm Using Pre-Processing for the Sparse Matrix-Vector Multiplication, 1992, IEEE, pp. 32-41.

Fred G. Gustavson and Andre Henriksson and Isak Jonsson and Bo Kagstrom and Per Ling: Superscalar GEMM-based Level 3 BLAS the On-going Evolution of a Portable and-High-Performance-Library (1998); Applied Parallel Computing, Published 1998, Springer, pp. 207-215.

vol. 1, "Foundations of Computer-Aided Chemical Process Design". Copyright 1981, American Institute of Chemical Engineering (2-Volume Series), pp. 77-143.

"Improving performance of linear algebra algorithms for dense matrices, using algorithmic prefetch". R. C. Agarwal, F. G. Gustavson, M. Zubair; IBM Journal of Research and Development; vol. 38, Issue 3 (May 1994); pp. 265-275; Year of Publication: 1994.

Gunnels et al., "A Family of High Performance Matrix Multiplication Algorithms", ICCS 2001, LNCS 2073, pp. 51-60, 2001 (also available at http://www.cs.utexas.edu/users/flame/pubs/ICCS2001.pdf).

Gunnels, et al. "A Novel Theoretical Model Produces Matrix Multiplication Algorithms That Predict Current Practice", IBM Research Report RC23443 (W0411-176), Nov. 19, 2004.

Vinod et al., A Framework for high-performance matrix multiplication based on hierarchical abstractions, algorithms and optimized low-level kernels, 2002, Concurrency and Computation: Practice and Experience 14(10): 805-839.

* cited by examiner

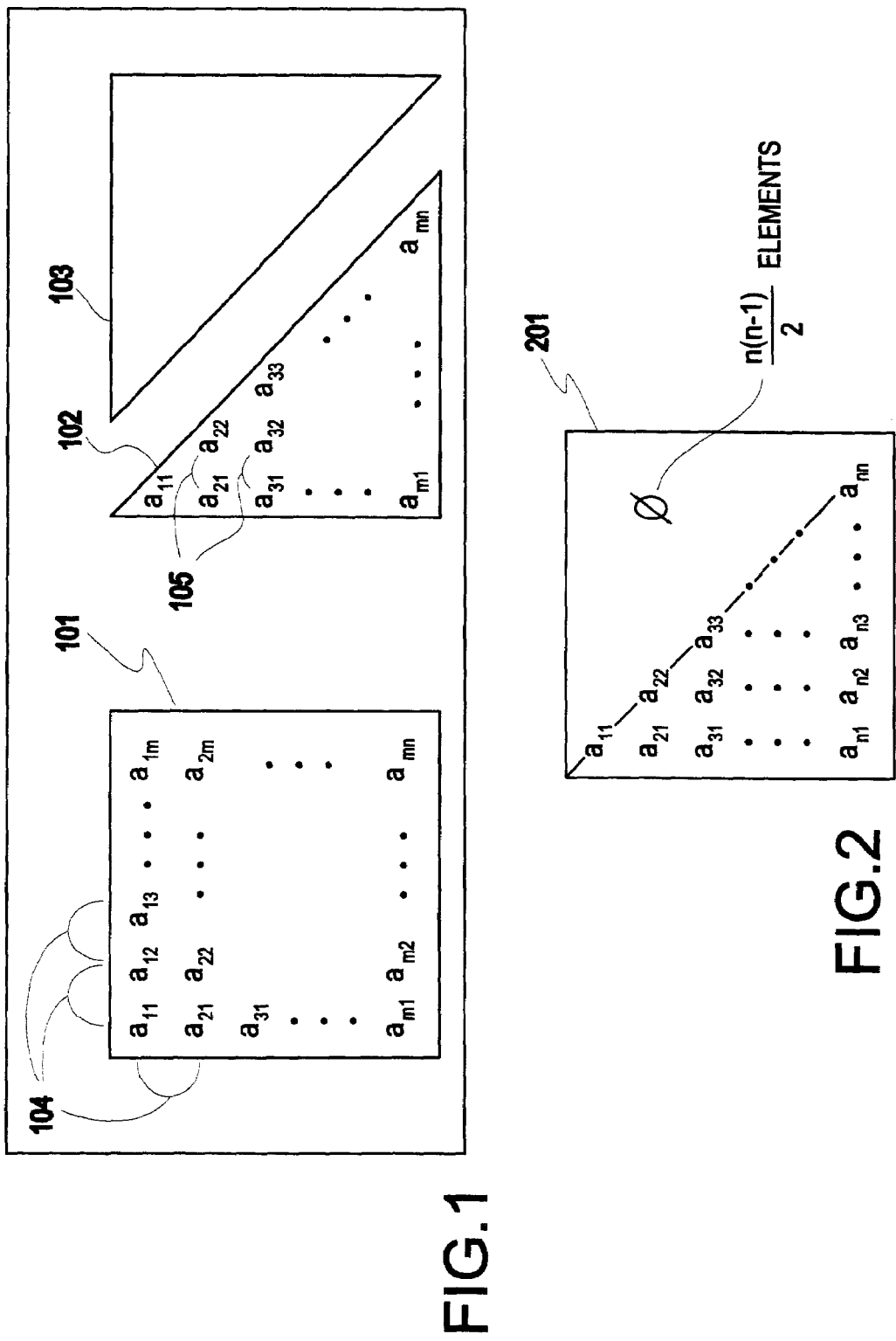

METHOD AND STRUCTURE FOR PRODUCING HIGH PERFORMANCE LINEAR ALGEBRA ROUTINES USING A HYBRID FULL-PACKED STORAGE FORMAT

This Application is a Continuation Application of U.S. patent application No. 10/671,933, filed on Sep. 29, 2003, to Gustayson et al., entitled "METHOD AND STRUCTURE FOR PRODUCING HIGH PERFORMANCE LINEAR ALGEBRA ROUTINES USING A HYBRID FULL-PACKED STORAGE FORMAT", having; now U.S. Pat. No. 7,386,582, issuing on Jun. 10, 2008.

CROSS-REFERENCE TO RELATED APPLICATIONS

The following seven Applications, including the present Application, are related:

1. U.S. patent application Ser. No. 10/671,887, filed on Sep. 29, 2003, to Gustavson et al., entitled "METHOD AND STRUCTURE FOR PRODUCING HIGH PERFORMANCE LINEAR ALGEBRA ROUTINES USING COMPOSITE BLOCKING BASED ON L1 CACHE SIZE", having;

2. U.S. patent application Ser. No. 10/671,933, filed on Sep. 29, 2003, to Gustavson et al., entitled "METHOD AND STRUCTURE FOR PRODUCING HIGH PERFORMANCE LINEAR ALGEBRA ROUTINES USING A HYBRID FULL-PACKED STORAGE FORMAT", having;

3. U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT", having;

4. U.S. patent application Ser. No. 10/671,889, filed on Sep. 29, 2003, to Gustavson et al., entitled "METHOD AND STRUCTURE FOR PRODUCING HIGH PERFORMANCE LINEAR ALGEBRA ROUTINES USING LEVEL 3 PREFETCHING FOR KERNEL ROUTINES", having;

5. U.S. patent application Ser. No. 10/671,937, filed on Sep. 29, 2003, to Gustavson et al., entitled "METHOD AND STRUCTURE FOR PRODUCING HIGH PERFORMANCE LINEAR ALGEBRA ROUTINES USING PRELOADING OF FLOATING POINT REGISTERS", having;

6. U.S. patent application Ser. No. 10/671,935, filed on Sep. 29, 2003, to Gustavson et al., entitled "METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES", having; and 7. U.S. patent application Ser. No. 10/671,934, filed on Sep. 29, 2003, to Gustavson et al., entitled "METHOD AND STRUCTURE FOR PRODUCING HIGH PERFORMANCE LINEAR ALGEBRA ROUTINES USING STREAMING", having, all assigned to the present assignee, and all incorporated herein by reference.

BACKGROUND OF THE INVENTION

1. Field of the Invention

The present invention relates generally to techniques for improving performance for linear algebra routines, with special significance to optimizing the matrix multiplication process. More specifically, a hybrid full-packed data structure allows a subroutine based on a rectangular standard row/column major format to be used for standard packed triangular matrices, thereby providing a three-to-five times improvement in speed and a reduction in storage by a factor of two.

2. Description of the Related Art

Scientific computing relies heavily on linear algebra. In fact, the whole field of engineering and scientific computing takes advantage of linear algebra for computations. Linear algebra routines are also used in games and graphics rendering.

Typically, these linear algebra routines reside in a math library of a computer system that utilizes one or more linear algebra routines as a part of its processing. Linear algebra is also heavily used in analytic methods that include applications such as supply chain management, as well as numeric data mining and economic methods and models.

The reason that linear algebra is so ubiquitous is that most engineering/scientific problems comprise non-linear scenarios which are combined by modeling as an aggregation of linearized sections, each respectively described by linear equations. Therefore, a linear network is formed that can be described in matrix format. It is noted here that the terms "array" and "matrix" are used interchangeably in the discussion of the present invention.

In general, a matrix representation A can be "simplified" by making a plurality of coordinate transformations so that the solution then becomes trivial to obtain in the final coordinates. Common coordinate transformations include transformation into the identity matrix or into the LU (lower/upper) factors format. A lower triangular matrix is L, and an upper triangular matrix is U. Matrix A becomes equal to the product of L by U (i.e., LU).

The process of coordinate transformation wherein two coordinate systems are combined into a single coordinate system involves matrix multiplication. Hence, the present invention focuses particularly on techniques that will particularly enhance matrix multiplication, but is not so limited. Typically, these linear algebra subroutines are stored in a math library of a computer tool that utilizes one or more linear algebra routines as a part of its processing.

A number of methods are have been used to improve performance of new or existing computer architectures for linear algebra routines.

However, because linear algebra permeates so many applications, a need continues to exist to optimize performance of matrix processing, including the need for efficiency in storing matrix data.

SUMMARY OF THE INVENTION

In view of the foregoing exemplary problems, drawbacks, and disadvantages of the conventional systems, it is, therefore, an exemplary feature of the present invention to provide a technique that improves performance for linear algebra routines.

It is another exemplary feature of the present invention to provide a method and structure to yield a solution to provide higher-performance linear algebra routines for traditionally-slow subroutines that process matrices stored in a triangular packed format.

It is another exemplary feature of the present invention to improve factorization routines which are key procedures of linear algebra matrix processing.

It is yet another exemplary feature of the present invention to reduce the storage requirements of standard row/column major format by a factor of two and maintain the same performance.

In a first exemplary aspect of the present invention, described herein is a computerized method of linear algebra processing, including processing a matrix data of a triangular packed format matrix in at least one matrix subroutine designed to process matrix data in a full format, using a hybrid full-packed data structure that provides a rectangular data structure for the triangular packed data.

In a second exemplary aspect of the present invention, described herein is an apparatus for linear algebra processing including a processor for processing a matrix data of a triangular packed format matrix in at least one matrix subroutine designed to process matrix data in a full format, using a hybrid full-packed data structure that provides a rectangular data structure for the triangular packed data.

In a third exemplary aspect of the present invention, described herein is a signal-bearing medium tangibly embodying a program of machine-readable instructions executable by a digital processing apparatus to perform the above-described method of processing matrix data.

In a fourth exemplary aspect of the present invention, described herein is a method of at least one of solving and applying a scientific/engineering problem, including at least one of using a linear algebra software package that computes one or more matrix subroutines according to the above-described method; providing a consultation for purpose of solving a scientific/engineering problem using the linear algebra software package; transmitting a result of the linear algebra software package on at least one of a network, a signal-bearing medium containing machine-readable data representing the result, and a printed version representing the result; and receiving a result of the linear algebra software package on at least one of a network, a signal-bearing medium containing machine-readable data representing the result, and a printed version representing the result.

In a fifth exemplary aspect of the present invention, described herein is a computerized method of converting data in a triangular matrix into a rectangular data format, including determining a portion of the matrix data stored in the triangular packed format that would comprise a square portion having a dimension approximately one half a dimension of the triangular packed format.

In a sixth exemplary aspect of the present invention, described herein is a data structure in a computer program used for processing matrix data, the data structure used to store a matrix data from a triangular matrix format, the data structure providing a rectangular structure for the data from the triangular matrix, wherein the data structure includes a first portion, a second portion, and a third portion. The first portion includes a square portion that includes the matrix data stored in the triangular packed format that would comprise a square portion having a dimension approximately one half a dimension of the triangular packed format. The second portion includes a first triangular portion of matrix data stored in the triangular packed format that remains after the square portion is eliminated. The third portion includes a second triangular portion of matrix data stored in the triangular packed format that remains after the square portion and the first triangular portions are eliminated. The data structure fits together the first portion, the second portion, and the third portion to form a rectangular data structure.

In a seventh exemplary aspect of the present invention, described herein is a method of providing a service that includes utilizing the methods of the present invention.

The present invention provides an efficient method to save memory space for storing matrix data that is in the conventional triangular packed format. It also provides a method to increase speed and performance for linear algebra routines using the traditionally-slow subroutines that process matrices stored in the conventional triangular packed format.

BRIEF DESCRIPTION OF THE DRAWINGS

The foregoing and other exemplary features, aspects and advantages will be better understood from the following detailed description of exemplary embodiments of the invention with reference to the drawings, in which:

FIG. 1 illustrates the full (rectangular) matrix format compared to the triangular (packed) matrix format;

FIG. 2 illustrates how storing a triangular matrix in memory in full format provides a poor utilization of memory space;

DETAILED DESCRIPTION OF AN EXEMPLARY EMBODIMENT OF THE INVENTION

Figure 3:
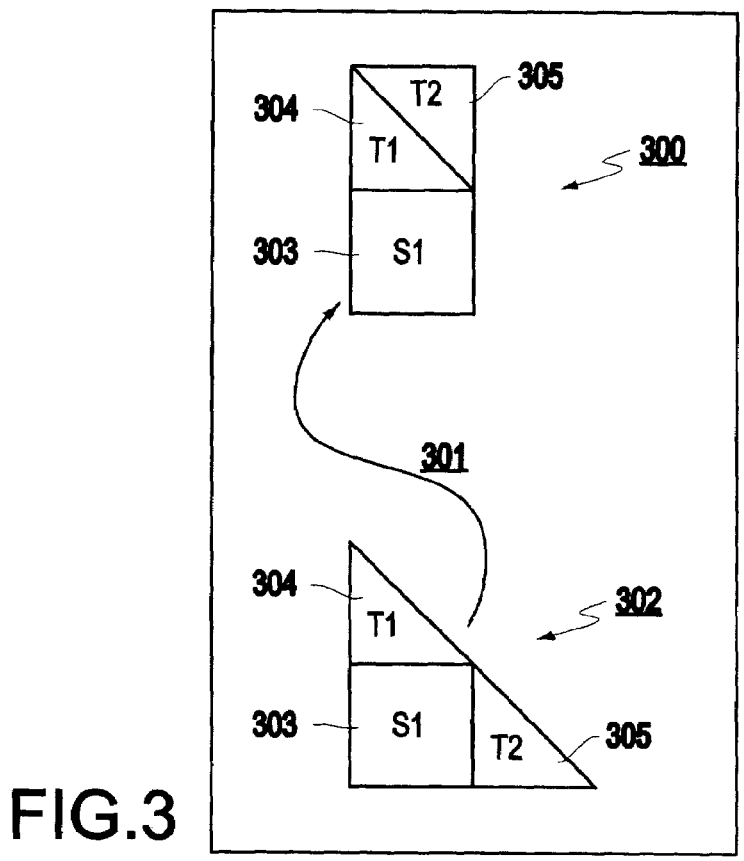
FIG. 3 illustrates pictorially the hybrid packed full data structure 300 of the present invention and the conversion process 301 from triangular matrix data 302 into the rectangular-shaped hybrid packed full format 300.

Referring now to the drawings, and more particularly to FIGS. 1-7, an exemplary embodiment of the present invention will now be discussed. Generally, the present invention provides a method to improve speed in linear algorithm processing by noting that linear algebra subroutines that process matrices stored in a rectangular format are three to five times faster than subroutines that process matrices stored in a packed (triangular) format.

As previously mentioned, a number of methods have been used to improve performance of computer architectures for linear algebra processing. However, the input data structures of matrices have not changed for conventional programming languages. That is, two data structures are used for symmetric matrices, including "packed" and "full".

The "packed" format uses half the storage, but performs three to five times slower. "Full" format uses twice the storage of packed, but performs three to five times faster than packed.

FIG. 1 shows the standard full format 101 familiar to most computer programmers, since Fortran and C operate on arrays as rectangular entities. In contrast, triangular and symmetric arrays 102, 103 store matrix data in a format resembling a triangle, either a lower triangular packed matrix 102 or an upper triangular packed matrix 103.

As shown in FIG. 2, if triangular array 102 is stored in standard full format 201, almost half of the memory positions are "wasted" (e.g., unused). Since full formats 201 are the only formats supported by Fortran and C, they have traditionally been used by most users of dense linear algebra software. The wasted memory space when triangular matrices are stored in memory is a first exemplary problem addressed by the present invention, but there is also addressed other problems including a problem of speed explained below.

Triangular and symmetric matrices T, S are special cases of a full square matrix A (e.g., having order N, where A has n rows and n columns). Triangular and symmetric matrices can be represented in full format. Assuming an example where N=4, the 4×4 matrix A will have 16 elements.

$$T = \begin{matrix} t_{11} & 0 & 0 & 0 \\ t_{21} & t_{22} & 0 & 0 \\ t_{31} & t_{32} & t_{33} & 0 \\ t_{41} & t_{42} & t_{43} & t_{44} \end{matrix}$$

$$S = \begin{matrix} s_{11} & s_{21} & s_{31} & s_{41} \\ s_{21} & s_{22} & s_{32} & s_{42} \\ s_{31} & s_{32} & s_{33} & s_{43} \\ s_{41} & s_{42} & s_{43} & s_{44} \end{matrix}$$

Because S above is symmetric, it has six redundant elements (e.g., $s_{21}, s_{31}, s_{41}, s_{32}, s_{42}, s_{43}$), and because T has zeroes above the diagonal, it also has six elements of no interest. Still, storage must be allocated for these six elements. In general, the example above having N=4 shows that N(N−1)/2 elements of triangular and symmetric matrices contain non-interesting (e.g., 0) or redundant information.

The following exemplary description of the present invention refers to a current linear algebra computing standard called LAPACK (Linear Algebra PACKage) and various subroutines contained therein. Information on LAPACK is readily available on the Internet. When LAPACK is executed, the Basic Linear Algebra Subprograms (BLAS), unique for each computer architecture and provided by the computer vendor, are invoked. LAPACK includes a number of factorization algorithms, some of which will be mentioned shortly.

However, it is noted that the present invention is more generic. That is, the concept presented in the present invention is not limited to LAPACK, as one of skill in the art would readily recognize after having taken the present application as a whole. The present invention is intended to cover the broader concepts discussed herein and contend that the specific environment involving LAPACK is intended for purpose of illustration rather than limitation.

As an example, Dense Linear Algebra Factorization Algorithms (DLAFAs) include almost entirely of matrix multiply subroutine calls such as Double-precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in an L1 cache.

The current state-of-the-art for DLAFAs is based on using level three BLAS on the two matrix data formats, "full format" and "packed format". Because these data formats are not the data formats used by the level 3 BLAS routines, excessive data copying is necessary, resulting in a performance loss.

The most heavily used type of level 3 L1 DGEMM kernel is Double-precision A Transpose multiplied by B (DATB), that is, C=C−A^T*B, where A, B, and C are generic matrices or submatrices, and the symbology A^T means the transpose of matrix A. It is noted that DATB is the only such kernel employed by today's state of the art codes, although it is only one of six possible kernels.

More specific to the present invention, the triangular (packed) format 102, 103 shown in FIG. 1 has a stride LD 105 that varies in the vertical dimension. "Stride" is the unit of data separating two consecutive matrix elements (e.g., in row or column, depending upon the storage indexing format) retrieved from memory.

Because of this varying stride, matrix subroutines in LAPACK for the packed format exist only in level 2 BLAS, which is significantly slower than level 3 BLAS matrix subroutines for the full format. As seen in FIG. 1, a full format matrix 101 has a constant stride LD 104 between elements in a row, whereas the triangular format varies.

Hybrid Full-Packed (HFP) Data Structures and Algorithms

FIG. 3 shows an exemplary inventive matrix data format 300, the hybrid full-packed format, of the present invention that provides a trivial, highly regimented conversion of existing or standard codes to new codes with identical mathematical characteristics and vastly superior performance characteristics.

As explained earlier, the problem addressed in the present invention is that triangular and symmetric arrays 102, 103 stored in standard full format 201 "waste" half of the memory positions. Full formats 101 are the only formats supported by Fortran and C, so they have traditionally been used by most users of dense linear algebra software. These formats allow the use of algorithms that exploit the level 3 BLAS and, therefore, allow such software to attain very high performance.

On the other hand, although the same arrays stored in packed format 102, 103 fully utilize storage by not wasting memory cells, inferior performance and speed is evinced since there are no level 3 packed BLAS.

A most widely accepted/utilized library for this area is the LAPACK standard, which supplies algorithms for both of the formats just described. An explanation of "conventional storage" and "packed storage" can be found at pages 107-109 of LAPACK User's Guide, 2nd Edition, which is readily available via the Internet. Some of the concepts of the two storage formats are already demonstrated pictorially in FIG. 1.

The present invention addresses these two problems of storage space and speed by combining features of both formats into a new hybrid format, referred to hereinafter as the "Hybrid Full-Packed (HFP) format", to obtain high performance using level 3 BLAS. Linear algebra matrices stored in this Hybrid Full-packed (HFP) format are compatible with level 3 BLAS routines. That is, they are plug-compatible with routines that conform to the level 3 BLAS standard. The present invention also takes advantage of LAPACK (and the BLAS) allowing "UPLO" specifiers, which indicate that the matrix under consideration is upper triangular or lower triangular.

FIG. 3 shows pictorially the Hybrid Full-packed (HFP) format 300 of the present invention and the conversion 301 of a triangular (packed) matrix 302 into the HFP data structure. It should be apparent the HFP data structure resembles a rectangular format that is associated with the full format 101 shown in FIG. 1. Hence, since the HFP data structure 300 places the triangular (packed) format 302 into a format that is identical to the full format, it is referred to as the Hybrid Full-packed format.

It should be obvious from FIG. 3 that the conversion from triangular into HFP includes a determination of a square portion S1 303 and two remaining triangular portions T1 304 and T2 305 and a fitting-together of this data to form the rectangular format 300. It should also be obvious that the HFP format 300 could also easily be converted into the triangular format 305 by simply reversing the fitting-together process 301.

Before providing details for the HFP conversion process, it should be obvious that the HFP format provides a savings in storing triangular matrix data. The advantage for speed comes from recognizing that the HFP data structure is fully compatible with matrix subroutines in LAPACK written in the faster full (rectangular) format.

Figure 4:
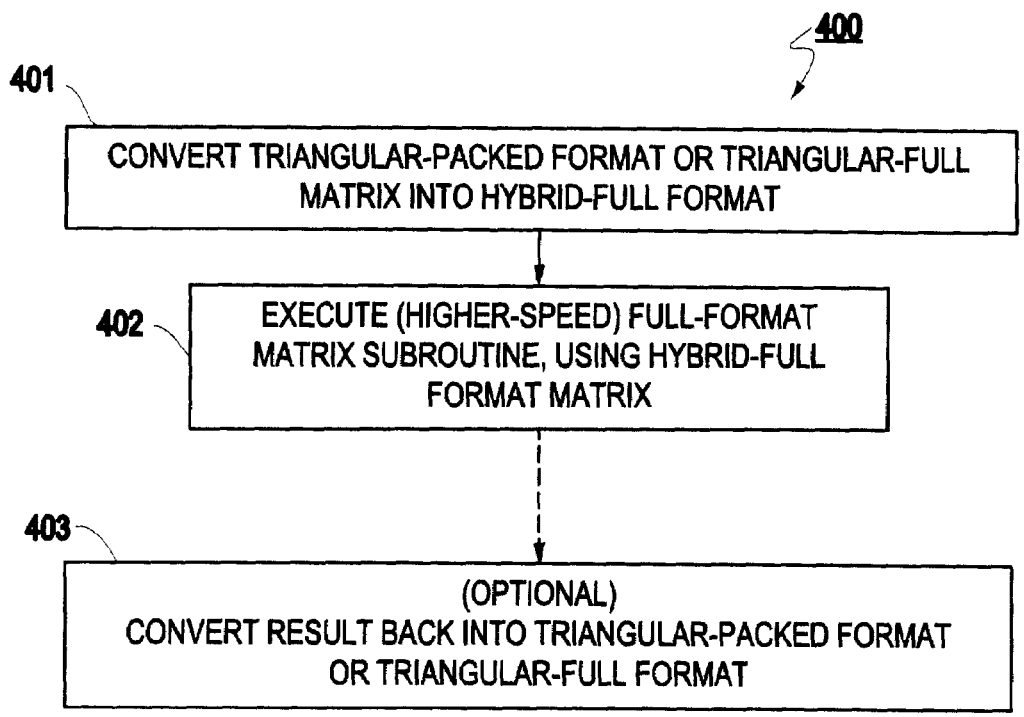
FIG. 4 is a flowchart 400 showing the general concept of how the present invention could be used to speed up matrix processing in an existing matrix subroutine package, by eliminating the need to process subroutines in the triangular-packed format or reduce the storage of full format by a factor of two.

Thus, as shown in FIG. 4, a preferred implementation 400 of the present invention exemplarily includes first a conversion in step 401 of both triangular packed or full format into hybrid full format. In step 402, the hybrid full format can then be executed by the faster (i.e., three to five times faster than packed) level 3 BLAS subroutines designed for full format. Finally, in step 403, the newly-processed data can then be converted back out of the hybrid full format, if desired. Thus, the present invention can be used to eliminate the need to use the slower subroutines that operate with the packed triangular format or to save half the storage that the full format subroutines require.

To more fully describe HFP in geometric terms, two size-equal or nearly size-equal isosceles triangles make a near square or square when they are concatenated along their diagonals. To store the original packed array (conceptually, an N by N array), HFP and its (implied) subarrays will be utilized as follows. Let N>1 be given. Define n1=floor (N/2) and n2=N−n1.

The expression "floor (N/2)" means that, if N is even, then n1=N/2 (an integer), and if N is odd, then n1 is the largest integer rounded down from the result of dividing by 2. For example, if N=78, then n1=39 and n2=39. If N=79, then again n1=39, but n2=40.

HFP will concatenate two packed arrays of size n1 and n2 into a single, full format array.

An example is given below. In general, there are two possible cases: N being even, and N being odd. All HPF subarrays in this example are assumed to be in standard column-major (Fortran) format, but this assumption is not necessary.
First case, N=9 (Odd Number):

| Upper Triangular-Packed (UP) | | | | | | | | | | Lower Triangular-Packed (LP) | | | | | | | | | |
|---|---|---|---|---|---|---|---|---|---|---|---|---|---|---|---|---|---|---|---|
| 00 | 01 | 02 | 03 | 04 | 05 | 06 | 07 | 08 | | 00 | | | | | | | | | |
|    | 11 | 12 | 13 | 14 | 15 | 16 | 17 | 18 | | 10 | 11 | | | | | | | | |
|    |    | 22 | 23 | 24 | 25 | 26 | 27 | 28 | | 20 | 21 | 22 | | | | | | | |
|    |    |    | 33 | 34 | 35 | 36 | 37 | 38 | | 30 | 31 | 32 | 33 | | | | | | |
|    |    |    |    | 44 | 45 | 46 | 47 | 48 | | 40 | 41 | 42 | 43 | 44 | | | | | |
|    |    |    |    |    | 55 | 56 | 57 | 58 | | 50 | 51 | 52 | 53 | 54 | 55 | | | | |
|    |    |    |    |    |    | 66 | 67 | 68 | | 60 | 61 | 62 | 63 | 64 | 65 | 66 | | | |
|    |    |    |    |    |    |    | 77 | 78 | | 70 | 71 | 72 | 73 | 74 | 75 | 76 | 77 | | |
|    |    |    |    |    |    |    |    | 88 | | 80 | 81 | 82 | 83 | 84 | 85 | 86 | 87 | 88 | |

The HFP format arrays used to hold the arrays shown above (UHFP for the left, LHFP on the right) include two full arrays stored contiguously and shown below. The first full array, T, holds two triangles, T1 and T2, of sizes n1 and n2. The leading dimension of T (LDT) is n1+1 (=n2) and the number of columns is n2 (=n1+1). In both cases T1 is stored in transposed (row-major) format so that the two triangles form a compact square.

| UHFP T | | | | | LHFP T | | | | |
|---|---|---|---|---|---|---|---|---|---|
| 44 | 45 | 46 | 47 | 48 | 44 | 00 | 10 | 20 | 30 |
| 00 | 55 | 56 | 57 | 58 | 54 | 55 | 11 | 21 | 31 |
| 01 | 11 | 66 | 67 | 68 | 64 | 65 | 66 | 22 | 32 |
| 02 | 12 | 22 | 77 | 78 | 74 | 75 | 76 | 77 | 33 |
| 03 | 13 | 23 | 33 | 88 | 84 | 85 | 86 | 87 | 88 |

The second full array contains the near square, S1, between the two triangles of size n1 by n2 or size n2 by n1, as shown below.

| UHFP S1 | | | | | LHFP S1 | | | |
|---|---|---|---|---|---|---|---|---|
| 04 | 05 | 06 | 07 | 08 | 40 | 41 | 42 | 43 |
| 14 | 15 | 16 | 17 | 18 | 50 | 51 | 52 | 53 |
| 24 | 25 | 26 | 27 | 28 | 60 | 61 | 62 | 63 |
| 34 | 35 | 36 | 37 | 38 | 70 | 71 | 72 | 73 |
|    |    |    |    |    | 80 | 81 | 82 | 83 |

The LHFP S1 array holding n2 by n1 matrix S1 also contains the transpose of matrix S1. It is generally true that a row major representation of the transpose of any rectangular matrix A is equal to a column major representation of matrix A and vice versa. It is noted that an array holding a representation of matrix A also contains a (different) representation of the transpose of matrix A.

It follows that LHFP S1 could have been defined as:

| LHFP S1$^T$ | | | | |
|---|---|---|---|---|
| 40 | 50 | 60 | 70 | 80 |
| 41 | 51 | 61 | 71 | 81 |
| 42 | 52 | 62 | 72 | 82 |
| 43 | 53 | 63 | 73 | 83 |

Furthermore, because of symmetry, UHFP S1 is then identically equal to LHFP S1$^T$.

The example for N odd generalizes (i.e., holds for all odd N>1) and the combined array, holding matrices T and S1, hold exactly NT=N(N+1)/2 elements, as do the UP and LP arrays. When N is even the two packed triangles are of sizes n1 and n2, where n1=n2.

An example for the second case, N even, is given below, where N=8 and n1=n2=4. It is noted that one would usually describe the even part first and the odd part second.

Second Case, N=8 (Even Number):

| UP | | | | | | | | | LP | | | | | | | | |
|----|----|----|----|----|----|----|----|----|----|----|----|----|----|----|----|----|----|
| 00 | 01 | 02 | 03 | 04 | 05 | 06 | 07 | 00 | | | | | | | | | |
|    | 11 | 12 | 13 | 14 | 15 | 16 | 17 | 10 | 11 | | | | | | | | |
|    |    | 22 | 23 | 24 | 25 | 26 | 27 | 20 | 21 | 22 | | | | | | | |
|    |    |    | 33 | 34 | 35 | 36 | 37 | 30 | 31 | 32 | 33 | | | | | | |
|    |    |    |    | 44 | 45 | 46 | 47 | 40 | 41 | 42 | 43 | 44 | | | | | |
|    |    |    |    |    | 55 | 56 | 57 | 50 | 51 | 52 | 53 | 54 | 55 | | | | |
|    |    |    |    |    |    | 66 | 67 | 60 | 61 | 62 | 63 | 64 | 65 | 66 | | | |
|    |    |    |    |    |    |    | 77 | 70 | 71 | 72 | 73 | 74 | 75 | 76 | 77 | | |

Again, both UHFP and LHFP formats include two full arrays. The first full array T holds two triangles T1 and T2 of total size n1 and n1+2 (n2). The LDT is n1+1 or n2 and the number of columns is n2 or n1+1. In both cases, T1 is stored in transposed format so that the two triangles form a compact square.

| UHFP T | | | | LHFP T | | | | |
|----|----|----|----|----|----|----|----|----|
| 44 | 45 | 46 | 47 | 44 | 00 | 10 | 20 | 30 |
| 00 | 55 | 56 | 57 | 54 | 55 | 11 | 21 | 31 |
| 01 | 11 | 66 | 67 | 64 | 65 | 66 | 22 | 32 |
| 02 | 12 | 22 | 77 | 74 | 75 | 76 | 77 | 33 |
| 03 | 13 | 23 | 33 | | | | | |

The second full array contains the square S1 between the two triangles of size n1 by n2 or size n2 by n1.

| UHFP S1 | | | | LHFP S1 | | | |
|----|----|----|----|----|----|----|----|
| 04 | 05 | 06 | 07 | 40 | 41 | 42 | 43 |
| 14 | 15 | 16 | 17 | 50 | 51 | 52 | 53 |
| 24 | 25 | 26 | 27 | 60 | 61 | 62 | 63 |
| 34 | 35 | 36 | 37 | 70 | 71 | 72 | 73 |

As a measure of performance, if any LAPACK level 3 routine that uses the standard, traditional packed storage scheme is taken, this routine implements a level 3 block-based algorithm by using packed level 2 BLAS and level 1 BLAS. On average, performance is a factor of three slower than the LAPACK full format version.

In contrast, the present invention proposes that, instead, a Simple Related Block Algorithm (SRBA) using block size, in succession, NB=n1, and then NB=n2, is written. When the new SRBA routine on the new HFP data structure is applied, a performance gain factor of three or more can be achieved.

There are approximately 120 such routines in LAPACK. An exemplary SRBA example in coding format is given below for the LAPACK routine, DPPTRF (Double-precision, Packed Positive-definite TRiangular Factorization), i.e., the packed Cholesky factorization.

This example using DPPTRF is only for purpose of demonstration, since it should be obvious, after taking the present application as a whole, that the approach using an SRBA, as presented in FIG. 4, is a generalized concept for these LAPACK routines and can even be easily extended to linear algebra processing outside the conventional LAPACK standard. Two format conversion routines may be required if the data needs to be transformed back-and-forth between packed and hybrid format. It should be obvious that other existing subroutines can be likewise implemented using coding similar to that shown below, as modified to make appropriate subroutine calls.

The SRBA includes four subroutine calls to existing level 3 BLAS-based LAPACK codes. Experience with the LAPACK algorithms makes it clear that this example is general for LAPACK algorithms. Further, the technique can be applied to other LAPACK-like algorithms.

Figure 5:
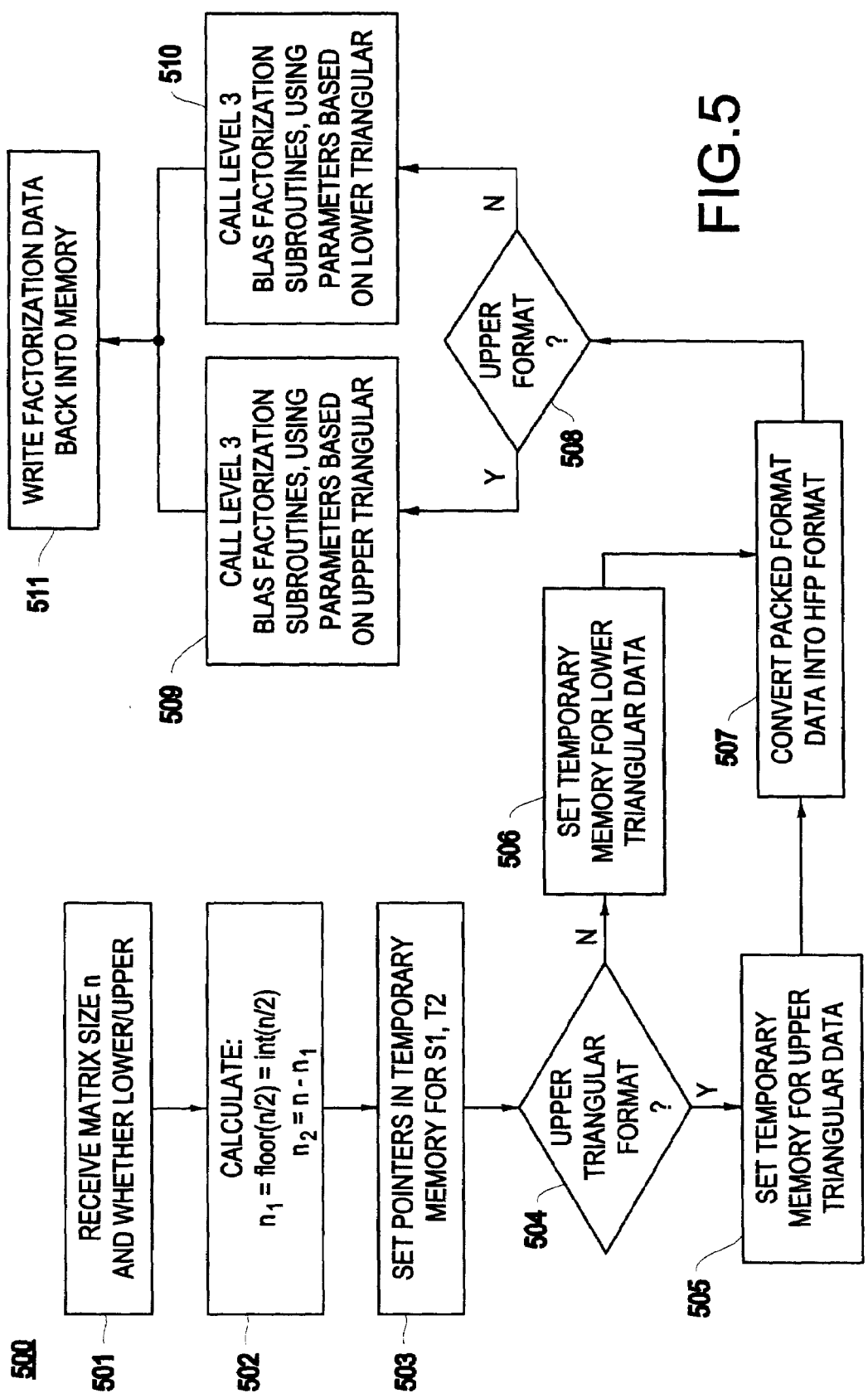
FIG. 5 provides an exemplary flowchart of a Simple Related Block Algorithm (SRBA) for a matrix factorization subroutine.
Figure 7:
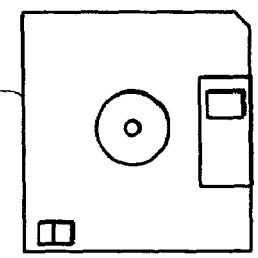
FIG. 7 illustrates the aspect of the present invention in which a computer storage medium 700 contains a set of instructions to implement the method of the present invention.

FIG. 5 shows in flowchart format 500 the following exemplary coding for an SRBA for the DPPTRF matrix factorization subroutine. In the code section below, the line numbers on the right side further correlates the flowchart with the coding and the following discussion.

In step 501 of FIG. 5, the SRBA receives information on packed matrix AP as to size n and whether the matrix is in lower triangular format or lower triangular format (see coding lines 1, 2). In step 502 (code lines 4, 5), n1, the floor (N/2) is calculated by using integer division, and n2 is calculated. In step 503 (lines 6, 7), pointers are set up for the square section S1 (see FIG. 3, item 303) and triangular section T2 (see item 305 in FIG. 3).

In step 504 (line 8), it is determined whether the matrix data is in upper triangular format. If so, in step 505 (lines 9-11), the temporary memory is configured for upper triangular data. If not, in step 506 (lines 13-15), the temporary memory is configured for lower triangular data.

In step 507 (line 17), the packed format data is converted into HFP format. This conversion subroutine would be straight forward in view of the mapping above for T1, T2 and S1.

Based on the determination in step 508 (line 18), the level 3 BLAS subroutine calls will be made using either upper triangular parameters in step 509 (lines 19-25) or lower triangular parameters in step 510 (lines 27-34). Finally, in step 511 (line 40), the result of the level 3 BLAS Cholesky factorization subroutines are converted back into standard packed format.

| An Exemplary Coding for an SRBA for the DPPTRF Matrix Factorization Subroutine | |
|---|---|
| subroutine dpptrf(uplo,n,AP,info) | (1) |
| !Programming Note: ilu = 0,1 iff (if and only if) uplo = 'U','L' | (2) |
| !declarations deleted for brevity of presentation | |
| info = 0 | (3) |
| N1=n/2 | (4) |
| N2=n−n1 | (5) |
| it2=0 ! -> T2 in BUF | (6) |
| is1=n2(n1+1) ! -> S1 in BUF | (7) |
| if(ilu.eq.0)then | (8) |
|   ldt= n1+1 ! lda of both T1 and T2 | (9) |
|   lds=n1 ! lda of S1 | (10) |
|   it1=1 ! -> T1 in BU | (11) else |

-continued

An Exemplary Coding for an SRBA for the DPPTRF Matrix Factorization Subroutine

```
                                                    (12)
      ldt= n2 ! lda of both T1 and T2          (13)
it1=ldt ! -> T1 in BU                          (14)
lds=n2 ! lda of S1                             (15)
(16)    !produce HFPformat in BUF from standard packed format
     in AP
      call dpthf(ilu,N,AP,BUF(it1),BUF(it2),ldt,BUF(is1),lds)   (17)
      if(ilu.eq.0)then                         (18)
         step 1                                (19)
         call dpotrf('L',n1, ldt, buf(it1), inf1)   (20)
         step 2                                (21)
         call dtrsm('L','L','N','N',n1,n2,one,buf(it1),ldt,
            Buf(is1),lds)                      (22)
         step 3                                (23)
         call dsyrk('U','T',n2,n1,-one,buf(is1),lds,one,
            Buf(it2),ldt)                      (23)
         step 4                                (24)
         call dpotrf('U',n2, ldt, buf(it2), inf2)   (25)
                                               (26)
      step 1                                   (27)
      call dpotrf('U',n1,ldt,buf(it1),inf1)    (28)
      step 2                                   (29)
         call dtrsm('R','U','N','N',n2,n1,one,buf(it1),
            Ldt,buf(is1),lds)                  (30)
         step 3                                (31)
      call dsyrk('L','N',n2,n1,-one,buf(is1),lds,one,
         Buf(it2),ldt)                         (32)
         step 4                                (33)
      call dpotrf('L',n2,ldt,buf(it2),inf2)    (34)
      endif                                    (35)
      info = inf1                              (36)
      goto 3                                   (37)
      info = n1 + inf2                         (38)
      3 continue                               (39)
      !overwrite AP with the Cholesky factor residing in BUF
      call dhftp(ilu,N,AP,BUF(it1),BUF(it2),ldt,BUF(is1),lds)   (40)
      return                                   (41)
      End                                      (42)
```

As a programming note, it is noted that a user could also input data that is already in HFP format. In that case, the above calls to DPTHF (packed to hybrid format transformation) and DHFTP (hybrid to packed format transformation) are not needed. (When the original matrix is in full format, subroutiness DFTHF and DHFTF would be used.)

A user provided with routines DPTHF and DHFTP would allow the user to readily perform conversions between (i.e., to and from) standard packed and HFP formats. A user provided with routines DFTHF and DHFTF would allow the user to readily perform conversions between (i.e., to and from) standard full and HFP formats.

Thus, this present invention affords any library development team the opportunity to replace all of its packed level 2 codes with new simple level 3 codes based on existing LAPACK level 3 full format codes. It also affords any library development team the opportunity to replace all of its full level 3 codes with new simple level 3 codes based on existing LAPACK level 3 full format codes.

The appeal is especially strong for Symmetric MultiProcessor (SMP) codes, since level 3 BLAS, as well as several of the LEQs (Linear EQuations), algorithms usually have good SMP implementations. It is noted that DPTHF and DHFTP offer efficient SMP implementations and that DFTHF and DHFTF offer efficient SMP implementations.

Finally, a library development team need only further develop their full format level 2 BLAS and slowly migrate out the current packed level 2 BLAS, as HFP level 2 BLAS are easily implemented by calls to full format level 2 BLAS. These new codes (packed level 2 BLAS using HFP format input) will be efficient since no calls to DPTHF or DHFTP are needed as then the data format is already HFP.

Now, because of symmetry and because an array holding A also holds $A^T$, there can be different ways to define this HFP format. It is partly the purpose of the following second example to indicate that there is some variability in defining HFP format. The HPF format to be given in this second example is essentially independent of uplo, as is the Cholesky code (steps 1 to 4 of the exemplary program) presented below.

SECOND EXAMPLE

The following provides a second exemplary embodiment to that used above for explanation. Let N be given and n1=N/2 and n2=N−n1, and supposing two packed arrays of size n1 and n2. Again, an example is given where N=odd and N=even (e.g. N=9 and N=8). Covering the odd and even cases for both UPLO='U' and 'L' is general.

The case N=9 (This is identical to that of the first example):

| UP | | | | | | | | | | LP | | | | | | | | | |
|----|----|----|----|----|----|----|----|----|----|----|----|----|----|----|----|----|----|----|----|
| 00 | 01 | 02 | 03 | 04 | 05 | 06 | 07 | 08 | 00 |    |    |    |    |    |    |    |    |    |    |
|    | 11 | 12 | 13 | 14 | 15 | 16 | 17 | 18 | 10 | 11 |    |    |    |    |    |    |    |    |    |
|    |    | 22 | 23 | 24 | 25 | 26 | 27 | 28 | 20 | 21 | 22 |    |    |    |    |    |    |    |    |
|    |    |    | 33 | 34 | 35 | 36 | 37 | 38 | 30 | 31 | 32 | 33 |    |    |    |    |    |    |    |
|    |    |    |    | 44 | 45 | 46 | 47 | 48 | 40 | 41 | 42 | 43 | 44 |    |    |    |    |    |    |
|    |    |    |    |    | 55 | 56 | 57 | 58 | 50 | 51 | 52 | 53 | 54 | 55 |    |    |    |    |    |
|    |    |    |    |    |    | 66 | 67 | 68 | 60 | 61 | 62 | 63 | 64 | 65 | 66 |    |    |    |    |
|    |    |    |    |    |    |    | 77 | 78 | 70 | 71 | 72 | 73 | 74 | 75 | 76 | 77 |    |    |    |
|    |    |    |    |    |    |    |    | 88 | 80 | 81 | 82 | 83 | 84 | 85 | 86 | 87 | 88 |    |    |

Both UHFP and LHFP formats consist of two full arrays. The first full array T holds two triangles T1 and T2 of sizes n1 and n2. The LDT is n1+1 and the number of cols is n2. For uplo='L', T1 is lower format and T2 is in upper format.

The same is true for uplo='U'. In the 'L' case, T2 is stored in upper format so that the two triangles form a compact square. In the 'U' case T1 is stored in lower format so that the two triangles form a compact square.

| UHFP T | | | | | LHFP T | | | | |
|----|----|----|----|----|----|----|----|----|----|
| 44 | 45 | 46 | 47 | 48 | 44 | 54 | 64 | 74 | 84 |
| 00 | 55 | 56 | 57 | 58 | 00 | 55 | 65 | 75 | 85 |
| 01 | 11 | 66 | 67 | 68 | 10 | 11 | 66 | 76 | 86 |

-continued

| UHFP T | | | | | LHFP T | | | | |
|----|----|----|----|----|----|----|----|----|----|
| 02 | 12 | 22 | 77 | 78 | 20 | 21 | 22 | 77 | 87 |
| 03 | 13 | 23 | 33 | 88 | 30 | 31 | 32 | 33 | 88 |

Because of symmetry, arrays UHFP T and LHFP T are identical.

The second full array S1 contains the near square between the two triangles of sizes n1 and n2. For uplo='L' S1 is stored in row major order (format is 'Transpose') and for uplo='U' S1 is stored in col major order (format is 'Normal').

| UHFP S1 | | | | | LHFP S1 | | | | |
|----|----|----|----|----|----|----|----|----|----|
| 04 | 05 | 06 | 07 | 08 | 40 | 50 | 60 | 70 | 80 |
| 14 | 15 | 16 | 17 | 18 | 41 | 51 | 61 | 71 | 81 |
| 24 | 25 | 26 | 27 | 28 | 42 | 52 | 62 | 72 | 82 |
| 34 | 35 | 36 | 37 | 38 | 43 | 53 | 73 | 73 | 83 |

Because of symmetry, UHFP S1 and LHFP S1 are identical.

Together these two arrays (concatenation along the row dimension) form a single full array of size 2*n1+1 rows by n2 columns. Note that LDS=n1 and that both arrays T and S1 are in column major format. The example is general for N odd and T+S1 hold exactly NT=N*(N+1)/2 elements as does the UP and LP arrays. Because of array identities for T and S1, it is convenient to just refer to HFP format.

When N is even, triangular arrays T1 and T2 of sizes n1 and n2=n1 result.

Following is an example where N=8 (Note: This is identical to that of the first example) for N=8.

| UP | | | | | | | | LP | | | | | | | | |
|----|----|----|----|----|----|----|----|----|----|----|----|----|----|----|----|----|
| 00 | 01 | 02 | 03 | 04 | 05 | 06 | 07 | 00 | | | | | | | | |
|    | 11 | 12 | 13 | 14 | 15 | 16 | 17 | 10 | 11 | | | | | | | |
|    |    | 22 | 23 | 24 | 25 | 26 | 27 | 20 | 21 | 22 | | | | | | |
|    |    |    | 33 | 34 | 35 | 36 | 37 | 30 | 31 | 32 | 33 | | | | | |
|    |    |    |    | 44 | 45 | 46 | 47 | 40 | 41 | 42 | 43 | 44 | | | | |
|    |    |    |    |    | 55 | 56 | 57 | 50 | 51 | 52 | 53 | 54 | 55 | | | |
|    |    |    |    |    |    | 66 | 67 | 60 | 61 | 62 | 63 | 64 | 65 | 66 | | |
|    |    |    |    |    |    |    | 77 | 70 | 71 | 72 | 73 | 74 | 75 | 76 | 77 | |

Both UHFP and LHFP formats consist two full arrays. The first full array T holds two triangles T1 and T2 of sizes n1 and n2. The LDT is n1+1 and the number of columns is n2. For uplo='L', T1 is lower format and T2 is in upper format. The same is true for uplo='U'. In the 'L' case, T2 is stored in upper format so that the two triangles form a near compact square.

In the 'U' case, T1 is stored in lower format so that the two triangles form a near compact square.

| UHFP T | | | | | LHFP T | | | | |
|----|----|----|----|----|----|----|----|----|----|
| 44 | 45 | 46 | 47 | | 44 | 54 | 64 | 74 | |
| 00 | 55 | 56 | 57 | | 00 | 55 | 65 | 75 | |
| 01 | 11 | 66 | 67 | | 10 | 11 | 66 | 76 | |
| 02 | 12 | 22 | 77 | | 20 | 21 | 22 | 77 | |
| 03 | 13 | 23 | 33 | | 30 | 31 | 32 | 33 | |

Again, array UHFP T is identical to array LHFP T.

The second full array S1 contains the square between the two triangles of sizes n1 and n2. For uplo 'L', S1 is stored in row major order (format is 'Transpose') and for uplo 'U', S1 is stored in column major order (format is 'Normal').

| UHFP S1 | | | | LHFP S1 | | | |
|----|----|----|----|----|----|----|----|
| 04 | 05 | 06 | 07 | 40 | 50 | 60 | 70 |
| 14 | 15 | 16 | 17 | 41 | 51 | 61 | 71 |
| 24 | 25 | 26 | 27 | 42 | 52 | 62 | 72 |
| 34 | 35 | 36 | 37 | 43 | 53 | 63 | 73 |

Again, array UHFP S1 is identical to array LHFP S1.

Together these two arrays (concatenation along the row dimension) form a single full array of size 2*n1+1 rows by n2. The example is general for N even and T+S1 hold exactly NT=N*(N+1)/2 elements, as does the UP and LP arrays.

Again, we can just refer to HFP format.

Any packed LAPACK L3 routine can be taken for implementation. It has a full L3 block algorithm. A simple related partition algorithm SRPA with partition sizes n1 and n2 can be written. The new SRPA is applied on the new HPF data structure.

It is noted that in Example 1, SRBA is used instead of the SRPA used here. Blocking refers to the array and partitioning refers to matrices. However, in the context of the present invention, there is really no difference.

An example for DPPTRF is given. The SRPA consists of four subroutine calls to existing L3 codes. It should be clear that this following example is general.

```
n1=n/2                                                          1
n2=n-n1                                                         2
it1=1 ! -> T1 in HPF                                            3
it2=0 ! -> T2 in HPF                                            4
ldt= n1+1 ! lda of both T1 and T2                               5
lds=n1 ! lda of S1                                              6
is1=n2*(n1+1) ! -> S1 in HPF                                    7
! the routine dpthf converts packed format in AP to HF format in 8
BUF
    call dpthf(ilu,N,AP,BUF(it1),BUF(it2),ldt,BUF(is1),lds)     9
! step 1                                                        10
    call dpof('L',buf(it1),ldt,n1,*1)                           11
! step 2                                                        12
    call dtrsm('L','L','N','N',n1,n2,one,buf(it1),ldt,buf(is1),lds) 13
! step 3                                                        14
    call dsyrk('U','T',n2,n1,-one,buf(is1),lds,one,buf(it2),ldt) 15
! step 4                                                        16
    call dpof('U',buf(it2),ldt,n2,*2)                           17
1 print*,'not pd 1',info,uplo                                   18
    goto 3                                                      19
2 print*,'not pd 2',info,uplo                                   20
```

-continued

```
3 continue                                                      21
! the routine dhftp converts HF format in BUF to packed format in  22
AP
    call dhftp(ilu,N,AP,BUF(it1),BUF(it2),ldt,BUF(is1),lds)    23
```

It is noted that lines 1-7 and lines 10 to 21 are independent of ILU. Only lines 8-9 and lines 22-23 depend on UPLO and they refer to the original packed format.

Users can use routines DPTHF and DHFTP, since this method is quite general to replace all their packed L3 codes with new simple L3 codes based on existing L3 full format codes. The appeal is especially strong for SMP codes as all ESSL L3 BLAS are enabled for SMP as well as several of the LEQ's algorithms have good SMP implementations.

The DPTHF and DHFTP subroutines offer efficient SMP implementations. Finally, full format L2 BLAS can be developed to replace current packed L2 BLAS, as HFP L2 BLAS are easily implemented by calls to full format L2 BLAS. These new codes will be efficient as no calls to DPTHF or DHFTP are needed as the data format is already HPF.

Exemplary Hardware/Software Implementation

Figure 6:
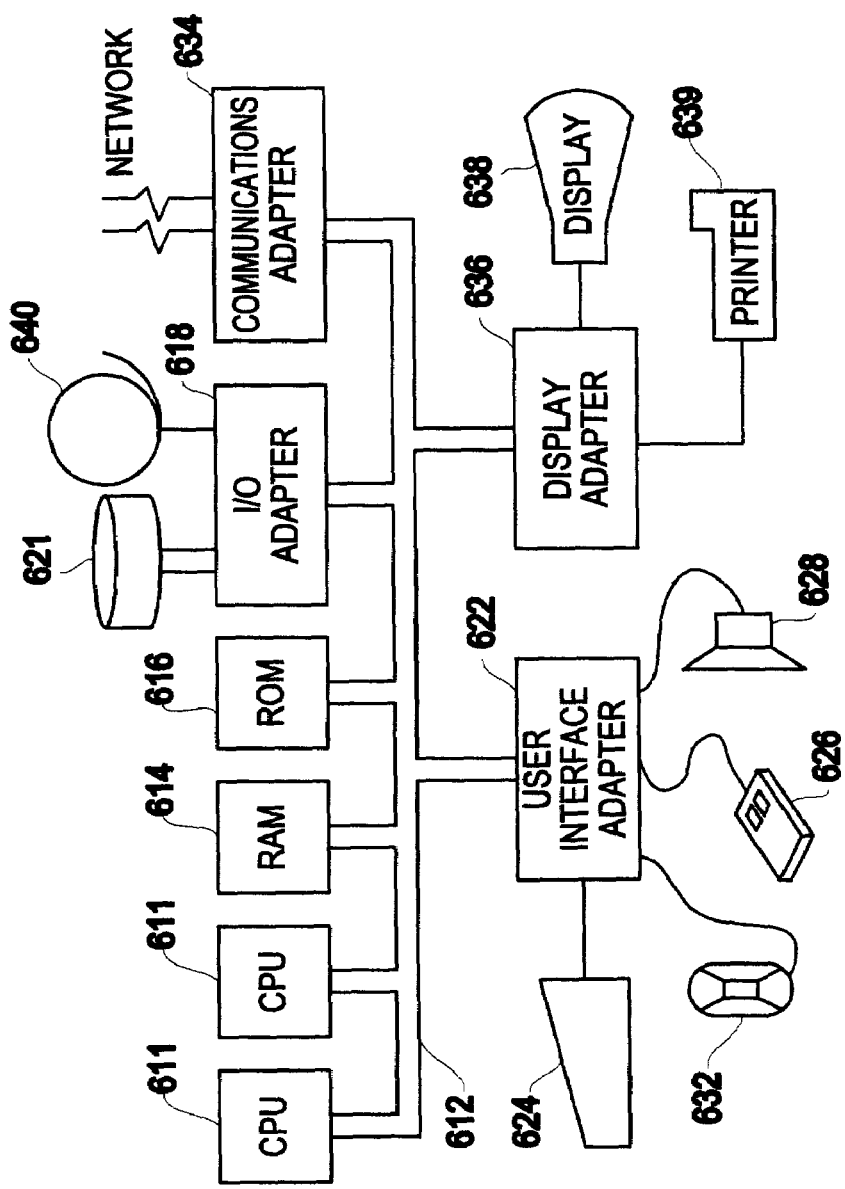
FIG. 6 illustrates an exemplary hardware/information handling system 600 for incorporating the present invention therein.

FIG. 6 illustrates a typical hardware configuration of an information handling/computer system 600 usable with the present invention, as described later, and which computer system preferably has at least one processor or central processing unit (CPU) 611. In the exemplary architecture of FIG. 6, the CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the invention.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 611 and hardware above, to perform the method of the invention.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

The second aspect of the present invention can be embodied in a number of variations, as will be obvious once the present invention is understood. That is, the methods of the present invention could be embodied as a computerized tool stored on diskette 700 that contains a series of matrix subroutines to solve scientific and engineering problems using matrix processing in accordance with the present invention. Alternatively, diskette 700 could contain a series of subroutines that allow an existing tool stored elsewhere (e.g., on a CD-ROM) to be modified to incorporate one or more of the principles of the present invention.

The second aspect of the present invention additionally raises the issue of general implementation of the present invention in a variety of ways.

For example, it should be apparent, after having read the discussion above that the present invention could be implemented by custom designing a computer in accordance with the principles of the present invention. For example, an operating system could be implemented in which linear algebra processing is executed using the principles of the present invention.

In a variation, the present invention could be implemented by modifying standard matrix processing modules, such as described by LAPACK, so as to be based on the principles of the present invention. Along these lines, each manufacturer could customize their BLAS subroutines in accordance with these principles.

It should also be recognized that other variations are possible, such as versions in which a higher level software module interfaces with existing linear algebra processing modules, such as a BLAS or other LAPACK module, to incorporate the principles of the present invention.

Moreover, the principles and methods of the present invention could be embodied as a computerized tool stored on a memory device, such as independent diskette 700, that contains a series of matrix subroutines to solve scientific and engineering problems using matrix processing, as modified by the technique described above. The modified matrix subroutines could be stored in memory as part of a math library, as is well known in the art. Alternatively, the computerized tool might contain a higher level software module to interact with existing linear algebra processing modules.

It should also be obvious to one of skill in the art that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how linear algebra processing can be more efficient by using the principles of the present invention.

In yet another aspect of the present invention, it should also be apparent to one of skill in the art that the principles of the present invention can be used in yet another environment in which parties indirectly take advantage of the present invention.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all these various methods of using the present invention, including the end user who uses the present invention indirectly by receiving the results of matrix processing done in accordance with the principles of the present invention.

That is, the present invention should appropriately be viewed as the concept that efficiency in the computation of matrix subroutines can be significantly improved for triangular packed matrix subroutines by converting the triangular data into the hybrid full-packed data structure, thereby allowing the processing to be executed using full-format subroutines that inherently have higher performance.

The present invention provides a generalized technique that improves performance for linear algebra routines. The method and structure discussed here, yields higher-performance linear algebra routine processing for traditionally-slow subroutines that process matrices stored in a triangular packed format and can provide three to five fold performance improvement over these subroutines.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A non-transitory signal-bearing storage medium tangibly embodying a program of machine-readable instructions executable by a digital processing apparatus to perform a method to at least one of reduce a memory space requirement and to increase a processing efficiency in a computerized method of linear algebra processing, said method comprising:

generating a hybrid full-packed data structure for processing data of a triangular matrix by one or more dense linear algebra (DLA) matrix subroutines designed to process matrix data in a full format, as modified to process matrix data using said hybrid full-packed data structure, as follows:

determining a portion of said triangular matrix data that would comprise a square portion having a dimension approximately one half a dimension of said triangular matrix data;

fitting a first triangular portion of said triangular matrix data into a first location relative to data of said square portion; and fitting a second triangular portion of said triangular matrix data into a second location relative to data of said square portion, wherein said first triangular portion, said second triangular portion, and said square portion fit together to form said rectangular data structure, wherein said hybrid full-packed data structure provides a substantially rectangular full format data structure for an entirety of said triangular matrix data and said triangular matrix comprises a triangular or symmetric/Hermitian matrix.

2. The non-transitory signal-bearing storage medium of claim 1, as comprising a computer product, as designed to serve as a carrier of said machine-readable instructions to be inserted into a drive of a computer for offloading said machine-readable instructions onto a memory of said computer.

3. The non-transitory signal-bearing storage medium of claim 1, as comprising a computer memory serving to store said machine-readable instructions for an execution of said instructions by said computer.

4. The non-transitory signal-bearing storage medium of claim 1, as comprising a computer memory serving to store said machine-readable instructions as said computer is executing said instructions.

5. The non-transitory signal-bearing storage medium of claim 1, as comprising a computer memory serving to store said machine-readable instructions for preparation to download said instructions to another computer.

* * * * *